United States Patent [19]

Poyser et al.

[11] Patent Number: 4,654,806
[45] Date of Patent: Mar. 31, 1987

[54] METHOD AND APPARATUS FOR MONITORING TRANSFORMERS

[75] Inventors: Thomas D. Poyser, McCandless; Randall N. Avery, Franklin Park; John W. Bankoske, Murrysville, all of Pa.; John D. Borst, Jefferson City, Mo.; Clive W. Kimblin, Churchill Boro., Pa.; Albert H. Maxwell, Raleigh, N.C.; David W. McElroy, Upper St. Clair, Pa.; Charles A. Peterson, Van Buran Township, Grant County, Ind.; Joseph R. Rostron, Murrysville, Pa.; David R. Smith; William H. South, both of McKeesport, Pa.; Michael W. Thomas, Marshall Township, Butler County, Pa.

[73] Assignee: Westinghouse Electric Corp., Pittsburgh, Pa.

[21] Appl. No.: 595,074

[22] Filed: Mar. 30, 1984

[51] Int. Cl.$^4$ .................... H02H 7/04; G01R 31/02; G08B 21/00
[52] U.S. Cl. .................... 364/551; 324/55; 361/35; 340/521; 340/646; 364/481
[58] Field of Search .................... 324/55, 546, 547; 364/506, 550, 551; 340/517, 520, 521, 635, 646; 361/35, 36, 37

[56] References Cited

U.S. PATENT DOCUMENTS

| 1,790,024 | 1/1931 | Rump | 340/646 |
|---|---|---|---|
| 2,704,841 | 3/1955 | Van Ryan | 340/646 |
| 2,743,432 | 4/1956 | Kerr | 340/646 |
| 2,795,779 | 6/1957 | Book | 324/55 |
| 2,834,920 | 5/1958 | Lennox et al. | 361/37 |
| 3,436,646 | 4/1969 | Prescott | 317/11 |
| 3,775,675 | 11/1973 | Freeze et al. | 324/102 |
| 3,789,293 | 1/1974 | Freeze | 324/55 |
| 3,793,559 | 2/1974 | Ristuccia | 317/14 C |
| 3,816,801 | 6/1974 | Almand, III | 361/37 |
| 3,821,516 | 6/1974 | Hayes et al. | 219/497 |
| 3,821,605 | 6/1974 | Pendrak | 361/37 |
| 3,846,698 | 11/1974 | Lawton | 324/51 |
| 3,855,503 | 12/1974 | Ristuccia | 317/27 R |
| 3,866,460 | 2/1975 | Pearce, Jr. | 361/35 |
| 3,896,376 | 7/1975 | Sinniger | 324/55 |
| 4,228,511 | 10/1980 | Simcoe et al. | 364/506 |
| 4,231,025 | 10/1980 | Turner, Jr. | 340/521 |
| 4,340,886 | 7/1982 | Boldt et al. | 340/518 |
| 4,356,470 | 10/1982 | Kogawa et al. | 340/517 |
| 4,376,389 | 3/1983 | Inoue et al. | 364/506 |
| 4,410,950 | 10/1983 | Toyoda et al. | 364/551 |
| 4,471,348 | 9/1984 | London et al. | 364/551 |
| 4,517,154 | 5/1985 | Dennis et al. | 364/550 |

OTHER PUBLICATIONS

Train et al, "The Detection of Partial Discharge in High Potential Transformers in Service", *IEEE P.E.S.*, (Paper T 74 024-6) 1974, pp. 1909-1916.

Primary Examiner—Errol A. Krass
Assistant Examiner—Joseph L. Dixon
Attorney, Agent, or Firm—B. R. Studebaker

[57] ABSTRACT

A microprocessor-based transformer monitoring system to provide continuous on-line monitoring and analysis of transformer operation. The transformer monitoring system periodically monitors various parameters related to transformer load and condition. Maximum, minimum, and instantaneous values of the parameters are stored and analzyed. To perform the analysis, a hierarchy of thresholds is associated with each parameter. When a parameter exceeds any one of the thresholds, a response is produced by the transformer monitoring system. The type of response depends on the level of the exceeded threshold in the hierarchy. The range of response produced by the transformer monitoring system includes: continuing normal periodic data collection and analysis, increasing the rate of data collection and analysis, recommending an on-site physical check of the monitored transformer, reducing transformer load, and taking the transformer off line.

20 Claims, 5 Drawing Figures

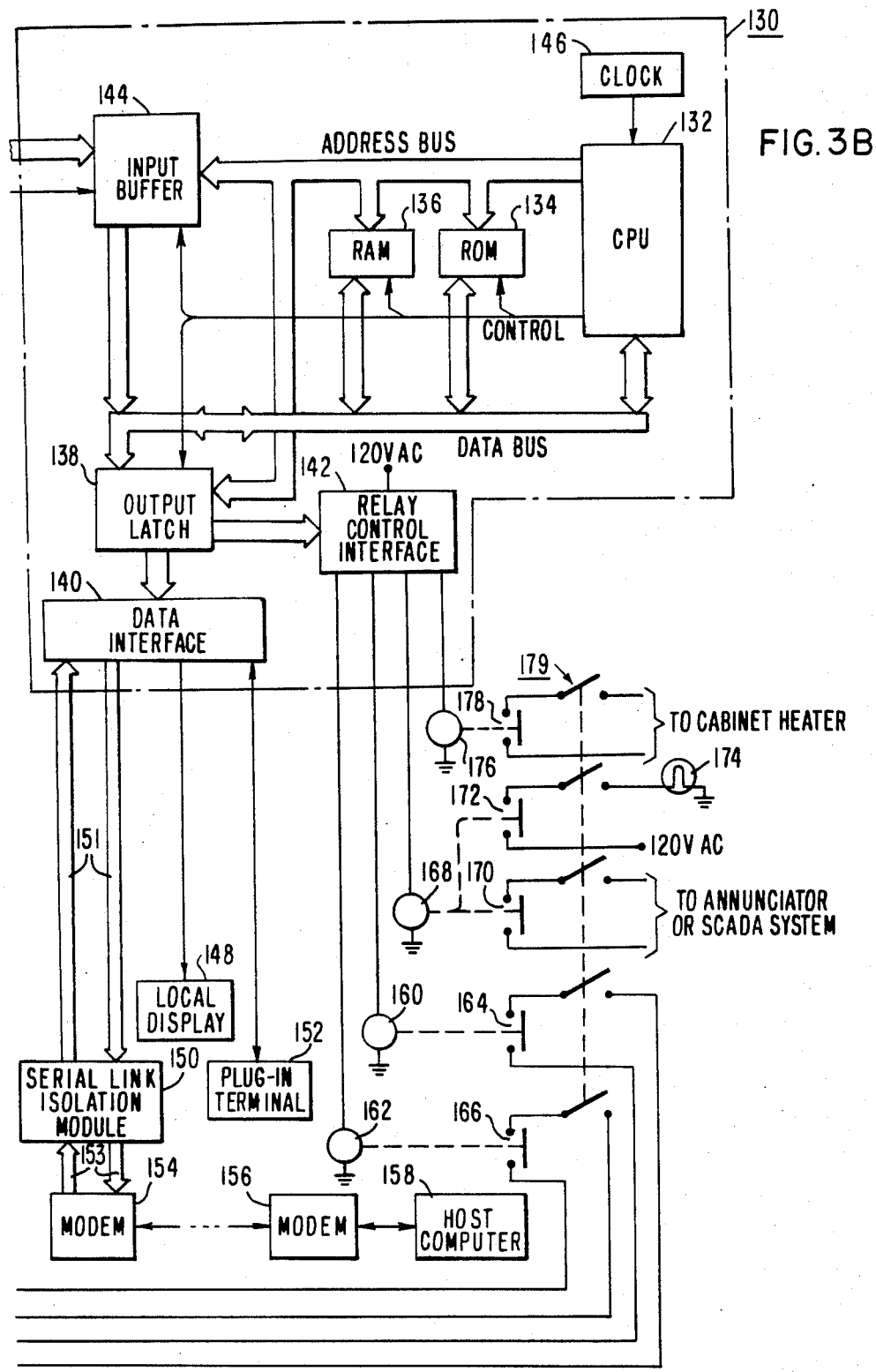

METHOD AND APPARATUS FOR MONITORING TRANSFORMERS

BACKGROUND OF THE INVENTION

1. Field of the Invention

This invention relates generally to a method and apparatus for monitoring transformers, and more particularly, to a continuous on-line transformer monitoring and analysis method and apparatus using a plurality of monitors to determine transformer performance.

2. Description of the Prior Art

The availability of power transformers is a key factor in the overall availability of a power transmission system. The reliability of the transformer, including the insulation and cooling systems, and the maintenance required during its useful life have a significant impact on availability. Decisions about the operating condition of the transformer and its attendant systems are typically based on a single parameter monitored over a relatively short time. At times, the result of such a test is unscheduled transformer downtime for maintenance, inspection, or repair. By increasing the knowledge of long-term changes in the operating condition of a power transformer, more accurate decisions can be made and the required action scheduled to reduce or eliminate unscheduled downtime. Since most problems with power transformers occur slowly over a long time, continuous monitoring of certain parameters and access to real-time data of the operational parameters of a power transformer is needed to analyze changes in the transformer's condition or health.

The need for continuous monitoring of power transformers has developed from the increased use of dissolved gas-in-oil and oil analysis, both manually sampled with the analysis performed in a laboratory every six to twelve months. Such a periodic analysis does not provide real-time or current data regarding transformer condition. Also, an historical analysis of data for each transformer can provide the following benefits to the operating utility: major reductions in unscheduled transformer downtime, major reductions in frequency of catastrophic failures, reduced repair costs, reduced maintenance, and the establishment of an historical data base for each transformer. Whereas present cooling control systems make decisions based on a single monitored parameter, such a transformer monitoring system could operate the transformer cooling system based on the results from several monitored parameters. Better decisions based on more data would provide improved transformer availability.

Thus, it would be desirable to develop a continuous on-line system for monitoring and analyzing the operating conditions of a transformer. Such a system could determine changes in the operating condition of a transformer based on an historic data base and identify potential problems before they become major or catastrophic. The problem can then be addressed during scheduled maintenance, or immediately, if necessary. Such a system could also provide improved reliability and predictability for operation of the transformer cooling system.

The present invention provides these desired benefits in the form of a microprocessor-based transformer monitoring system. Using a number of sensors and signal conditioners located within or near the transformer, the transformer monitoring system provides real-time on-line data collection and analysis for determining the transformer's condition, operating the cooling system, and determining whether more extensive analysis or a load reduction is advisable. The transformer monitoring system maximizes transformer availability through early detection of problems requiring immediate correction and proper analysis of less-serious problems not requiring immediate action. More reliable analysis and alarm activation are provided by monitoring several parameters, rather than the single parameter of prior art techniques. The present system can also be expanded with additional sensors and signal conditioners as they become available.

SUMMARY OF THE INVENTION

A microprocessor-based transformer monitoring system to provide continuous on-line monitoring and analysis of transformer operating parameters is disclosed. The transformer monitoring system monitors analog and status inputs related to transformer condition and load, performs calculations based on the input values, makes decisions based on the inputs, controls cooling and protective equipment, and communicates the data to a local display unit, remote terminal, or host computer. With the transformer monitoring system, changes in the operating condition of the transformer can be determined from a historic data base and potential problems identified prior to becoming major or catastrophic problems.

The transformer, monitoring system, which is remotely located in a cabinet at the transformer site, collects and analyzes all data on a periodic basis. For instance, in one embodiment of the present invention, the data is collected and analyzed every ten seconds. The microcomputer in the transformer monitoring system is periodically polled by the host computer, where the collected data is further analyzed to identify potential problems and update the transformer's historic data base. A single host computer can poll the microcomputer of several transformer monitoring systems.

In one embodiment of the present invention, the input parameters include hot-spot temperature, oil temperature, current in the hottest winding, relative corona level, the amount of hydrogen gas dissolved in oil, ambient temperature, oil level status, oil flow status, pump bearing status, and cooling equipment contactor status. It is also possible to monitor many other parameters, for instance, pressure and oil dielectric quality.

Transformer monitoring system outputs include a problem indicator relay contact, a visual indicator, digital displays, visual status indicators, and a communication interface for communications with a portable printer/terminal or with the host computer. In one embodiment of the present invention the host computer is linked to the transformer monitoring system using fiber optic cables and telephone lines.

BRIEF DESCRIPTION OF THE DRAWINGS

The present invention may be better understood, and the further advantages and uses thereof more readily apparent, when considered in view of the following detailed description of exemplary embodiments, taken with the accompanying drawings in which:

FIGS. 3A and 3B are detailed block diagrams of the transformer monitoring system in one embodiment of the present invention.

DESCRIPTION OF THE PREFERRED EMBODIMENTS

Figure 1:
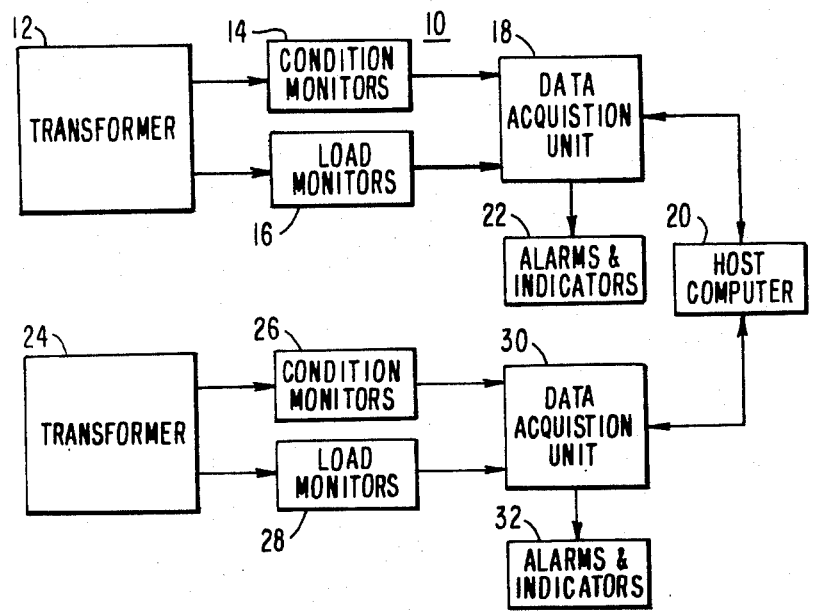
FIG. 1 is a block diagram of a transformer monitoring system constructed according to the teachings of the present invention.

Turning to FIG. 1, there is shown a transformer monitoring system 10 constructed according to the teachings of the present invention. FIG. 1 is a simplified block diagram of a transformer monitoring system for showing the general features thereof. More detail will be discussed in conjunction with FIG. 3.

The transformer monitoring system 10 monitors the performance of a transformer 12 using condition monitors shown collectively as condition monitors 14, and load monitors shown collectively as load monitors 16. The condition and load monitors 14 and 16 monitor various parameters associated with the transformer 12 and produce signals representative thereof. The signals produced by the condition and load monitors 14 and 16 are input to a data acquisition unit 18. The data acquisition unit 18 compares the values of the monitored transformer parameters against predetermined thresholds, and based on the results thereof triggers various alarms and indicators shown generally as alarms and indicators 22. The data acquisition unit 18 also communicates bidirectionally with a host computer 20.

In one embodiment of the present invention, various parameters associated with the transformer 12 are monitored every ten seconds with the minimum and maximum values, and the time of occurrence, of each parameter stored in memory. The data acquisition unit 18 performs this function. Also, in one embodiment, the host computer 20 collects and analyzes data from the data acquisition unit 18 once per twenty-four-hour period. Minimum, maximum, and instantaneous values of the monitored parameters are collected and compared to acceptable limits stored in the host computer 20. Rates of change per twenty-four hours are also computed and compared to acceptable limits. Using this data, a historic data base for the transformer 12 is created and updated. The host computer 20 can be programmed to provide reports, at any desired interval, based on the data collected. For example, the report can be produced every thirty days and include daily data, trend analysis, the historic data base containing minimum and maximum values, and a summary statement based on the data collected. Also, the host computer 20 can indicate unacceptable data and initiate appropriate actions: for example, increasing the frequency of data collection and analysis by the host computer 20, more extensive on-site transformer analysis by utility personnel, reducing the load on the transformer 12, or taking the transformer 12 off line. To indicate potential problems occurring between the data collections and analyses by the host computer 20, a visual indication and contact closure, controlled by the data acquisition unit 18, are provided. These are shown generally as the alarms and indicators 22.

The host computer 20 can also be used to monitor the condition of a transformer 24 also shown in FIG. 1. Performance of the transformer 24 is monitored by condition monitors shown generally as condition monitors 26 and load monitors shown generally as load monitors 28. A data acquisition unit 30 similar to the data acquisition unit 18 analyzes the data collected by the condition and load monitors 26 and 28 and determines whether each is within a predetermined threshold. Depending on the results of this comparison, an alarm or indicator can be activated. These are shown generally as alarms and indicators 32 on FIG. 1. The host computer 20 periodically receives data from the data acquisition unit 30 and analyzes it in a manner similar to the analysis performed on the data from the data acquisition unit 18. The transformer monitoring system 10 can be extended to monitor any number of transformers similar to the transformer 12 or the transformer 24, by the addition of condition and load monitors, data acquisition units and alarms and indicators. The host computer 20 can also poll these additional data acquisition units on a periodic basis.

Figure 2:
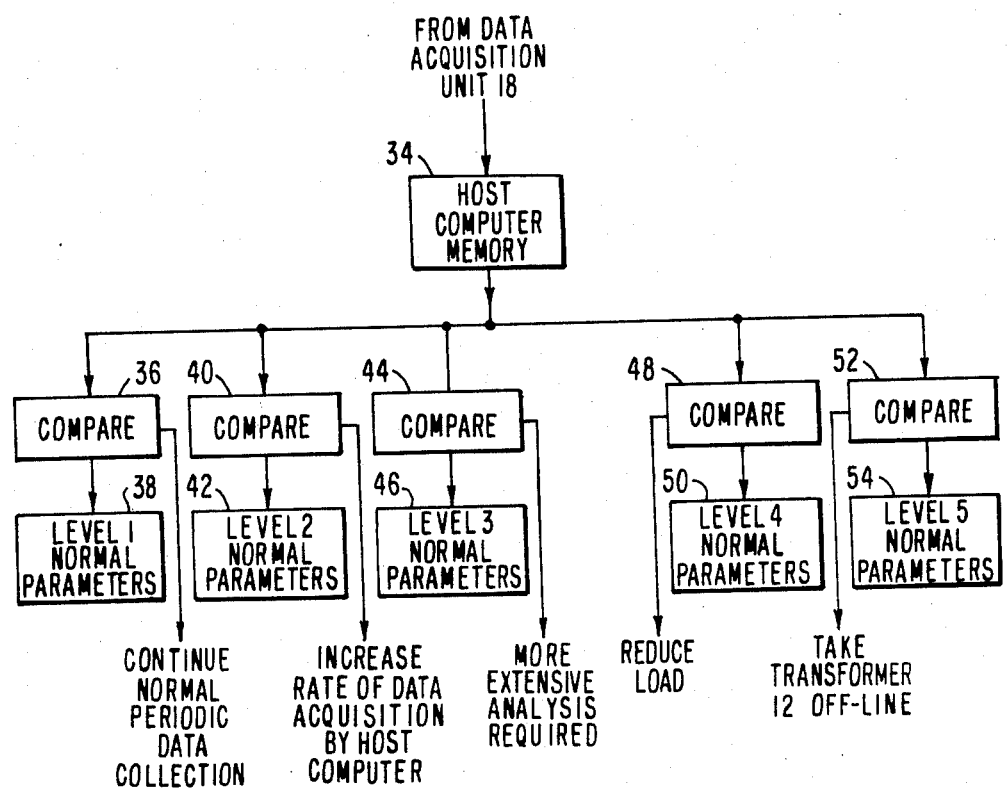
FIG. 2 is a flow chart indicating the responses produced by the host computer in one embodiment of the present invention.

Turning to FIG. 2, there is shown a flow chart depicting, in a general sense, the operation of the host computer 20 (of FIG. 1) in comparing the collected data with the predetermined thresholds. The comparison process is performed for both the transformers 12 and 24 of FIG. 1. Since the process is the same for both the transformer 12 and 24, it will be discussed only in conjunction with the transformer 12. A host computer memory 34 is one element of the host computer 20 of FIG. 1. In a comparison function 36, the collected data stored in the host computer memory 34 is compared with level 1 normal parameters 38. If none of the monitored parameters exceed the level 1 normal parameters 38, the comparison function 36 causes the host computer 20 to continue normal periodic data collection. In a comparison function 40, the collected data is compared with level 2 normal parameters 42. If one of the parameters exceed a level 2 normal parameter 42, the host computer 20 increases the rate of data acquisition from the microprocessor 18, thus providing more frequent analysis of the transformer 12. If any of the collected data exceeds one of the level 3 normal parameters 46, then a comparison function 44 advises that more extensive analysis is required to more definitively analyze the problem. The utility is contacted and advised to perform more extensive on-site analysis of the transformer 12. When a level 4 normal parameter 50 is exceeded by one of the monitor parameters, a comparison function 48 recommends a load reduction on the transformer 12. Lastly, if a level 5 normal parameter 54 is exceeded by the collected data, a comparison function 52 recommends that the transformer 12 be taken off line. Further details regarding this process performed by the host computer 20 will be discussed in conjunction with Table 1.

Figure 3A:
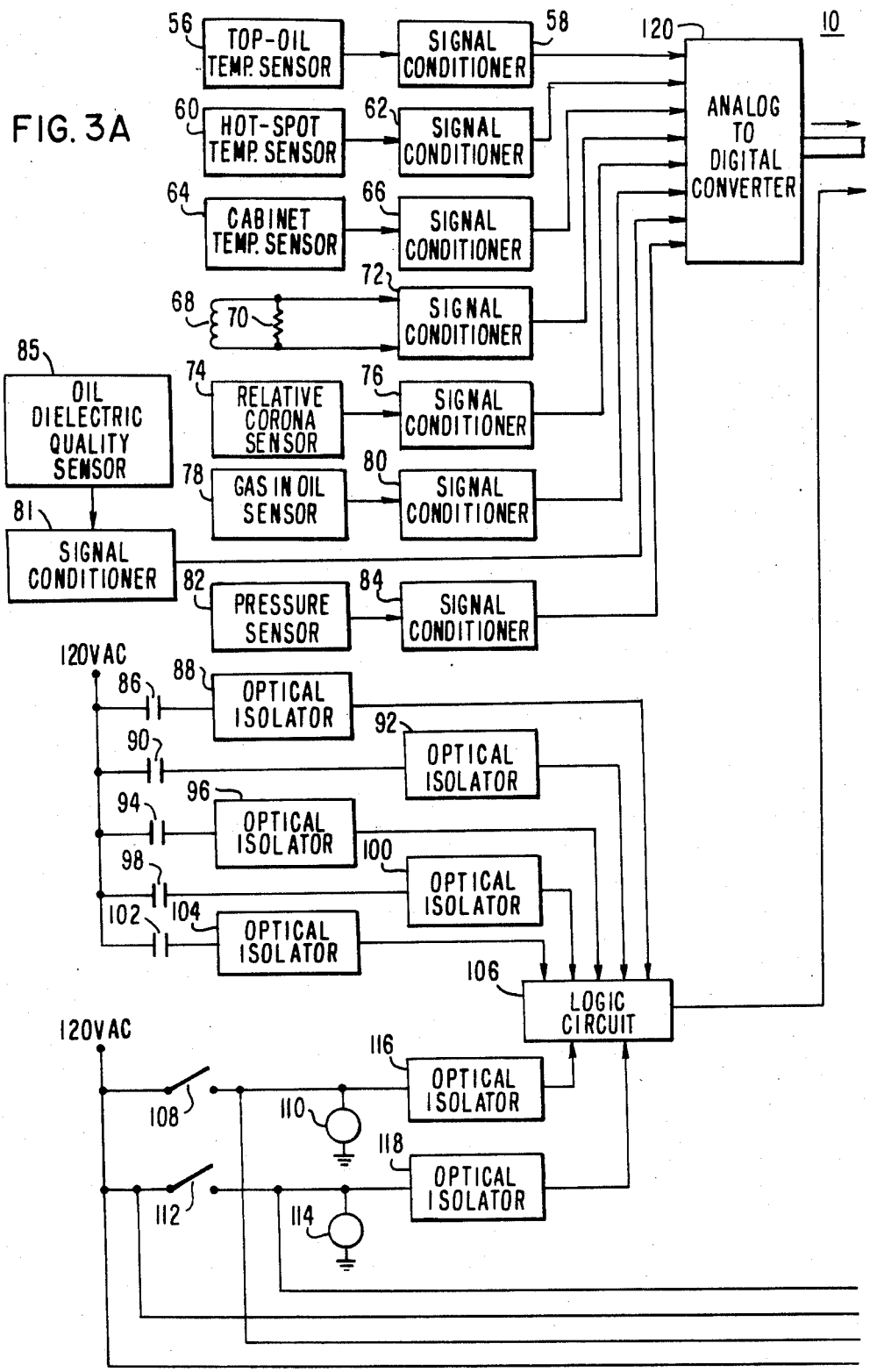

Turning to FIGS. 3A and 3B, there is shown a block diagram of the transformer monitoring system 10 constructed according to the teachings of the present invention. A top oil temperature sensor 56 measures the temperature of the oil in the top oil volume of the transformer 12 (see FIG. 1). The top oil temperature sensors 56 is located in the top oil region in a wall-mounted well (not shown in FIG. 3). The well is located as close as possible to the top cooler valves associated with the first stage of cooling. The top oil temperature sensor 56 is calibrated using well-known industry standards to produce a signal representative of the temperature of the top oil volume. The signal from the top oil temperature sensor 56 is input to a signal conditioner 58. The transformer monitoring system 10 can include more than one top oil temperature sensor, such as top oil temperature sensor 56, for monitoring the top oil temperature. The temperature values from more than one sensor can be averaged to provide a single top oil temperature value.

A cabinet temperature sensor 64 is mounted in the cabinet of the transformer monitoring system 10 for producing a signal representative of the ambient cabinet temperature. The signal from the cabinet temperature sensor 64 is input to a signal conditioner 66. Thermocouples or resistance-temperature detectors can be used for the temperature sensors 56 and 64.

A hot-spot temperature sensor 60 produces a hot-spot temperature signal, input to a signal conditioner 62, representative of the transformer hot-spot temperature. Using one well-known technique, the hot-spot temperature sensor 60, which is mounted at the transformer hot spot, includes a mechanical dial indicator with a liquid-filled capillary sensor, a well into which the sensor is placed, a heater inside the well, a current transformer to heat the heater, and a current balancing autotransformer to adjust the current in the heater. A helical coil in the dial indicator assembly is unwound (wound) by the contracting (expanding) liquid in the filled capillary tube. A shaft connected to the center of the helical coil rotates, thus turning the indicating pointer, and producing the hot-spot temperature signal.

A current transformer 68 and a parallel resistor 70 measure the current in the winding temperature dial indicator current transformer secondary. That is, the current transformer 68 and the resistor 70 produce a signal representative of the percent of rated load in the winding containing the hot spot current transformer (not shown in FIG. 3). The resulting signal is input to a signal conditioner 72. A relative corona sensor 74 measures the internal acoustic emissions from partial discharges within the transformer and produces a signal representative thereof. A signal from the relative corona sensor 74 is input to a signal conditioner 76 for modification to the correct standard for analysis by the transformer monitoring system 10. A gas-in-oil sensor 78 is a continuous gas analyzer for monitoring the concentration of various gases in the transformer oil. The signal from the gas-in-oil sensor 78 is input to a signal conditioner 80 for producing a signal compatible with the other monitored parameters. A pressure sensor 82 monitors the pressure in the gas space of the transformer and produces a signal representative thereof for input to a signal conditioner 84. The signal conditioner 84 produces a signal compatible with the other parameters monitored by the transformer monitoring system 10.

An oil dielectric quality sensor 85 measures the dielectric properties of the transformer oil and produces a signal representative thereof for input to a signal conditioner 81. The signal conditioner 81 produces a signal compatible with the other parameters monitored by the transformer monitoring system 10.

The transformer monitoring system 10 also includes various status inputs based on the position of contacts. These contact closures are monitored to detect proper or improper operation. The monitored contacts include an oil level contact 86, an oil flow group 1 contact 90, an oil flow group 2 contact 94, a pump bearing group 1 contact 98, and a pump bearing group 2 contact 102. Groups 1 and 2 refer to the group 1 and 2 cooling units associated with the transformer monitored by the transformer monitoring system 10. The oil level contact 86, mounted in the oil preservation system or main oil tank, closes when the oil level falls below a predetermined limit. The oil level contact 86 is connected to an input terminal of an optical isolator 88 for isolating the 120 VAC signal of the oil level contact 86 from the low-level direct current signals associated with the transformer monitoring system 10. The optical isolator 88 produces a signal representing the position of the oil level contact 86 for input to a logic circuit 106. The oil flow group 1 and 2 contacts 90 and 94 are mounted in the coolant circulation system and close when the oil flow in the respective cooling system falls below a predetermined value. An optical isolator 92 is connected to the oil flow group 1 contact 90 and produces a signal representing the position thereof for input to the logic circuit 106. An optical isolator 96 is connected to the oil flow group 2 contact 94 for producing a signal representing the position thereof for input to the logic circuit 106. An optical isolator 100 is connected to the pump bearing group 1 contact 98, which monitors the condition of the non-contaminating oil pump bearings associated with the group 1 cooling system, for producing a signal, representing the position thereof, for input to the logic circuit 106. An optical isolator 104 is connected to the pump bearing group 2 contact 102 for producing a signal representing the position thereof, for input to the logic circuit 106. The pump bearing group 2 contact 102 monitors the condition of the non-contaminating oil pump bearings associated with the group 2 cooling system.

The status of the coooling equipment contactors is also monitored by the transformer monitoring system 10. A group 1 cooling unit switch 108 is connected between a 120 VAC source and a group 1 contactor coil 110. When the group 1 cooling unit switch 108 is closed, the group 1 contactor coil 110 is energized to activate the group 1 cooling system. Closure of the group 1 cooling unit switch 108 is detected by an optical isolator 116 for producing a signal, representing the position of the group 1 cooling unit switch 108, for input to the logic circuit 106. The position of a group 2 cooling unit switch 112 is also monitored. The group 2 cooling unit switch 112 is connected between 120 VAC and a group 2 contactor coil 114. The position of the group 2 cooling unit switch 112 is monitored by an optical isolator 118 for producing a signal representative of the position thereof. The optical isolator 118 produces a signal for input to the logic circuit 106. By monitoring the position of the group 1 cooling unit switch 108 and the group 2 cooling unit switch 112, the transformer monitoring system 10 determines the correct position for the monitored contacts associated with the group 1 and group 2 cooling units. The logic circuit 106 produces a signal, for input to an interface 120, that represents the status of the parameters monitored by contact closures.

The transformer monitoring system 10 can be implemented with digital electronics; in one embodiment a microcomputer 130 can be used. Specifically, the microcomputer 130 includes a central processing unit (CPU) 132, a read-only memory (ROM) 134, a random-access memory (RAM) 136, an output latch 138, a data interface 140, a relay control interface 142, and an input buffer 144. The CPU 132 communicates via an address bus with the ROM 134, the RAM 136, the output latch 138, and the input buffer 144. Through control lines, the CPU 132 controls operation of the ROM 134, the RAM 136, the output latch 138, and the input buffer 144. Data is transferred bidirectionally on the data bus, connecting the CPU 132 with the ROM 134, the RAM 136, the output latch 138, and the input buffer 144. The clock 146 provides appropriate timing signals to the CPU 132.

A data interface 140 of the microcomputer 130 responds to data signals from the output latch 138 for controlling a local display 148. A relay control interface 142 responds to signals from the output latch 138 for controlling the cooling systems associated with the monitored transformer. A 120 VAC signal is also input to the relay control interface 142.

The data interface 140 communicates bidirectionally with a serial link isolation module 150 (via fiber optics cables 151) and a plug in terminal 152. The serial link isolation module 150 communicates bidirectionally with a modem 154, and the modem 154 communicates bidirectionally with a modem 156. The modem 156 communicates bidirectionally with a host computer 158.

The application software that supports the functional operation of the microprocessor 130 is stored in the ROM 134. Data collected or calculated, and threshold setpoints used by the transformer monitoring system 10 are stored in the RAM 136. A portion of RAM 136 is supported by a battery back-up to provide non-volatile RAM.

All transformer parameters monitored by the transformer monitoring system 10 (i.e. by the analog monitors and the digital, contact closure, monitors) are scanned periodically by the microcomputer 130. In one embodiment the parameters are read every 10 seconds. As the input values are measured, the data is checked to verify proper operation of the sensors and signal conditioners. As will be discussed hereinafter, parameters outside acceptable limits are flagged, indicating the need for investigation.

The output signals from the signal conditioners 58 (top oil temperature), 62 (hot-spot temperature), 66 (cabinet temperature) 76 (relative corona) and 80 (the amount of gas dissolved in the oil) are input to the microcomputer 130 via an analog-to-digital converter 120, (and linearly converted to percent and parts per million, as necessary, by software in the microcomputer 130).

The contact closure status indicators are converted to logic levels in the logic circuit 106 and read in groups of eight (that is, one bit for each status input). A change in contact status is recognized by the microcomputer 130 if the change has occurred for a fixed number of scan periods. In one embodiment the number of scan periods is two. This prevents operating perturbations with short time constants from affecting the validity of the data collected.

The microcomputer 130 scans all analog and status (i.e contact closure) inputs at various scanning rates. In one embodiment, the scan rate is ten seconds. During that period, the following functions are performed by the microprocessor 130.

1. All analog and status, i.e., contact closure, inputs are read and calculations made based on the data received.
2. Measured inputs are checked to determine data validity.
3. Measured and calculated data are compared with acceptable limits.
4. Minimum and maximum values for each parameter and the time of occurrence of each minimun and maximum are determined and stored.

Figure 4:
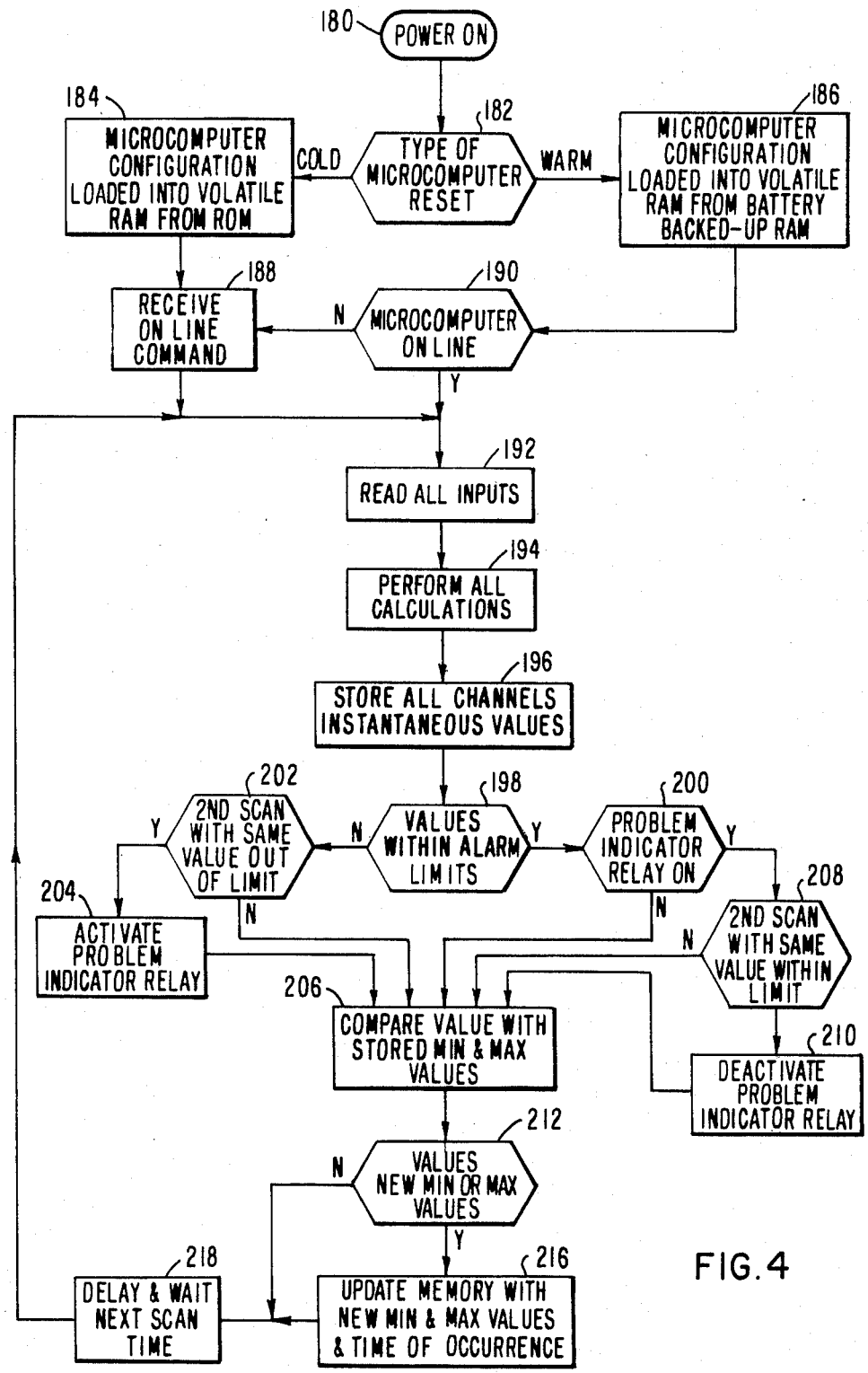
FIG. 4 is a software flow chart illustrating the programming of the microcomputer of FIG. 3.

Each of these functions are performed by software, to be discussed in conjunction with FIG. 4, operating the microcomputer 130.

The local display 148 displays information related to the winding hot spot temperature, the top oil temperature, and the status of the contact closures. Also, the local display 148 indicates whether the microcomputer 130 is running or stopped. The data interface 140 also includes an RS-232C communications port for connection to the plug-in terminal 152 or the serial link isolation module 150. In this way, the plug-in terminal 152 can locally interrogate the microcomputer 130, collect data, and reconfigure the microcomputer 130.

The serial link isolation module 150 communicates bidirectionally with the data interface 140. If other transformer monitoring systems are used in the vicinity of the transformer monitoring system 10, the signals therefrom can be input to the serial link isolation module 150, via fiber optic cables, thereby simplifying communications with the host computer 158. Fiber optics cable 153 connect the serial link isolation module 150 to the modem 154. The modem 154 is of the automatic answer or automatic dial/automatic answer type and communicates with the modem 156, which is of the automatic dial or automatic dial/automatic answer type. In one embodiment of the present invention, the communications channel between the modem 154 and the modem 156 is a public telephone link capable of operating at 1,200 bits per second in full duplex.

The host computer 158 periodically establishes communication with the microcomputer 130 using the automatic dialing feature of the modem 156. In one embodiment of the present invention, the host computer establishes this link once every twenty-four hours. A unique identification number is assigned to each data acquisition unit, like the data acquisition unit 18, that is to be polled by the host computer 158. The host computer 158 issues commands containing the identification number of the data acquisition unit it wishes to poll and due to the unique identification number, only the data acquisition unit associated with the unique identification number responds to the host computer 158. The analysis performed by the host computer 158 will be discussed in conjunction with Table 1.

Under certain extreme problem situations, recognized by the microcomputer 130, the microcomputer 130 can establish communications to the host computer 158 using the autodial feature of the modem 150 and the autoanswer feature of modem 156.

The relay control interface 142 operates several relay coils to control the cooling system of the monitored transformer and a problem indicator lamp 174 of the transformer monitoring system 10. A first output signal from the relay control interface 142 operates a relay coil 160. When the relay coil 160 is energized, a cooling bank group 1 contact 164 is closed. The cooling bank group 1 contact overrides the position of the group 1 cooling unit switch 108 and energizes the group 1 contactor oil 110. This energizes the equipment associated with the group 1 cooling unit of the monitored transformer. Similarly, a relay coil 162 is energized by a second output signal from the relay control interface 142 to close a cooling bank group 2 contact 166. The cooling bank group 2 contact 166 overrides the position of the group 2 cooling unit switch 112 to activate the group 2 cooling unit by energizing the group 2 contactor coil 114. The signals that activate the relay coils 160 and 162 are based on the winding hot spot temperature, top oil temperature, or load current. The hot spot temperature at which the relay coils 160 and 162 are energized is input by the user with the plug-in terminal 152 or at the host computer 158. Also, the deenergization set points for the relay coils 160 and 162 are set by the user.

A third signal from the relay control interface 142 controls a problem indicator relay coil 168. The problem indicator relay coil 168 operates an annunciator contact 170 and a problem indicator contact 172. Energization of the problem indicator relay coil 168 (and therefore operation of the annunciator contact 170 and the problem indicator contact 172) is determined by software in the microcomputer 130. In one embodiment of the present invention, any one of the following conditions energizes the problem indicator relay coil 168: the top oil temperature in excess of a set point, such as 120° C., a winding hot-spot temperature in excess of a set point, such as 150° C., a cabinet temperature greater than a set point, such as 70° C., any analog channel input outside a programmed high or low limit, the oil level contact 86 activated, closure of either the pump bearing group 1 contact 98 or the pump bearing group 2 contact 102, a deenergized indication from the group 1 contact 90 when the group 1 contactor coil 110 is energized, a deenergized indication from the group 2 contact 94 when the group 2 contactor coil 114 is energized, the analog-to-digital converter 102 outside tolerance limits based upon a self test, or the copying of data during reset or power restoration of the data acquisition unit 18. Closing of the problem indicator contact 172 lights a problem indicator lamp 174. The annunciator contact 170 can be used to activate an annunciator or provide an input to the supervisory control and data acquisition (SCADA) system.

A fourth signal from the relay control interface 142 energizes a relay coil 176 for closing a cabinet heater contact 178. The relay coil 176 is energized when the cabinet temperature drops below a predetermined temperature, for example, −15° C. in one embodiment. When the cabinet heater contact 178 closes, a cabinet heater (not shown in FIG. 3) is activated.

A five-element ganged switch 179 can be opened to override the position of the cooling bank group 1 contact 164, the cooling bank group 2 contact 166, the annunciator contact 170, the problem indicator contact 172, and the cabinet heater contact 178, for set-up and testing of the transformer monitoring system 10. Under normal operations the five-element ganged switch 179 is closed.

FIG. 4 illustrates one implementation for operating the microcomputer 130 of FIG. 3. This implementation involves a software flow chart continuously processed by the microcomputer 130 to read the input values and update the values stored in memory.

The flow chart of FIG. 4 begins at an entry step 180 followed by a decision step 182 where the type of microcomputer 130 reset is determined. If the reset is from a cold state, the microcomputer 130 configuration is loaded into a volatile random access memory from read-only memory at a step 184. If the reset is from a warm state, at a step 186 the microcomputer 130 configuration is loaded into volatile random access memory from battery backed-up random access memory. After step 186, processing continuous to a decision step 190 where a determination is made regarding whether the microcomputer 130 is on line, i.e., periodically reading all inputs. If the microcomputer 130 is not on line, processing continues to a step 188 to await an on-line command. The step 188 is also entered from the step 184. When an on-line command is received, processing continues to a step 192 where all input parameters are read, then to a step 194 where all calculations are performed, and followed by step 196 where all instantaneous values of the monitored parameters are stored. Processing then moves to a decision step 198 where it is determined whether the instantaneous values are within alarm limits. These alarm limits are discussed above in conjunction with energization of the problem indicator relay coil 168; see FIG. 3. If one or more of the instantaneous values are not within limits, processing moves to a decision step 202 where it is determined whether the present scan is the second scan with the same input value out of limit. If the response is affirmative, the problem indicator relay coil 168 is energized at a step 204. If the response from the decision step 202 is negative, the instantaneous value is compared with stored minimum and maximum values at a step 206.

If the present values are within alarm limits, processing moves from the decision step 198 to a decision step 200, where it is determined whether the problem indicator relay coil 168 is energized. If the problem indicator relay is not energized, processing moves to the step 206 where each instantaneous value is compared with the stored minimum and maximum values. If the problem indicator relay is on, the decision step 200 is followed by a decision step 208 where a determination is made whether this is the second scan with the same value within its limit. If the response is negative, processing moves to the step 206; if the response is positive, processing moves to a step 210 where the problem indicator relay coil 168 is deenergized. From the step 210, processing moves to the step 206 where the each instantaneous value is compared with the stored minimum and maximum values. From the step 206, processing moves to a decision step 212 where it is determined whether the present value represents a new minimum or new maximum value. If the response is affirmative, at a step 216 memory is updated with the new minimum or maximum value and its time of occurrence. After the step 216, processing moves to a step 218 where the microcomputer 130 holds and waits for the next scan time. If the present value does not represent a new minimum or new maximum value, then the decision at the decision step 212 is negative and processing moves to the step 218 to await the next scan time. Once the next scan time has arrived, processing moves from the step 218 back to the step 192 where all inputs are again read. In this manner, the microcomputer 130 continuously monitors the input and updates the memory as necessary.

A communications hierarchy establishes the host computer 20 (see FIG. 1) as a polling master that periodically initiates a telephone call to the data acquisition unit 18 and to any other similar data acquisition unit 30 that can be linked to the host computer 20. Under certain extreme problem situations recognized by the microcomputer 130, the microcomputer 130 could establish communications to the host computer 20 using the autodial feature of the modem 154 and the autoanswer feature of the modem 156. In one embodiment of the invention, each day, the host computer 158 collects data corresponding to the transformer condition during the previous twenty-four hours. The collected data includes instantaneous, minimum, and maximum values for each of the analog input channels and the calculated channels, including the time of occurrence of each minimum and maximum. The host computer 158 also collects data regarding the status of the digital (i.e. contact closure) inputs and the status of the microcomputer 130. The collected data is used to update the minimum aind maximum values stored in the memory of the microcomputer 130.

The discussion of the software flow chart of FIG. 4 is intended for purposes of illustration and not limitation. It is anticipated that alternative embodiments of the present invention may be conceived wherein the location of the instructions for performing the monitoring is different from that shown in the discussed flow chart. These alternative embodiments are believed to fall within the spirit and scope of the present invention as claimed hereinafter. The novel transformer monitoring system 10 can also be implemented using traditional hardwired techniques.

ture must be greater than 140° C., or the relative corona must be greater than 20%, or the gas in oil must be greater than 500 parts per million, or the change of the amount of gas in oil must be greater than 50 parts per million per twenty-four hours, or the oil level status indicator must be off indicating insufficient oil level, or the oil flow status contact on (off) while the cooling bank status ciontact is off (on), or the pump bearing status indicator is on.

For the resulting action on Table 1 to be contact utility—recommend reduce load, any of the following conditions must exist: the top oil temperature must be greater than 105° C., or the hot spot temperature must be greater than 150° C., or the relative corona must be greater than 30%, or the gas in oil must be greater than

TABLE 1

| Action | Top Oil Temperature (°C.) | | Hot Spot Temperature (°C.) | | Relative Corona (Percent) | | H$_2$ in oil (ppm) | | Change of H$_2$ in oil (ppm/24 hr) | | Oil Level On/Off | | Oil Flow On/Off | | Cooling Bank On/Off | | Pump Bearing On/Off |
|---|---|---|---|---|---|---|---|---|---|---|---|---|---|---|---|---|---|
| Normal Periodic Reporting | ≦90 | + | ≦105 | + | ≦10 | + | ≦300 | + | ≦25 | + | On | + | On + Off + | | On + Off | + | Off |
| Increase Data Aquisition by Host Computer | >90 | or | >105 | or | >10 | or | >300 | or | >25 | | | | | | | | |
| Contact Utility - more extensive analysis required | >100 | or | >140 | or | >20 | or | >500 | or | >50 | | Off | | On + Off + | | Off On | | On |
| Contact Utility - recommend reduce load | >105 | or | >150 | or | >30 >25 >25 | or + | >1000 >800 | or + | >75 >50 | | | | | | | | |
| Contact Utility - recommend take transformer off-line | >110 | or | >170 | or | >50 >30 >30 | or + | >1500 >750 | or + | >100 >75 | | | | | | | | |

The algorithms used by the host computer 158 to analyze the collected data are based on Table 1. The result of the analysis would be one of the five listed actions. For the resulting action on Table 1 to be to continue normal periodic reporting the following conditions must occur: the top oil temperature must be less than or equal to 90° C., and the hot spot temperature must be less than or equal to 105° C., and the relative corona must be less than or equal to 10%, and the amount of the selected gas (in this case, hydrogen) in oil must be less than or equal to 300 parts per million, and the rate of change of the amount of gas in oil must be less than or equal to 25 parts per million per twenty-four hours, and the oil level status indicator must be on (which indicates sufficient oil level), and the oil flow status contact and cooling bank status contact must both be on or must both be off, and the pump bearing status indicator must be off.

For the resulting action on Table 1 to be increase rate of data acquisition by the host computer, any of the following conditions must exist: the top oil temperature must be greater than 90° C., or the hot spot temperature must be greater than 105° C., or the relative corona must be greater than 10%, or the gas in oil must be greater than 300 parts per million, or the change of the amount of gas in oil must be greater than 25 parts per million per twenty-four hours.

For the resulting action on Table 1 to be contact utility—more extensive analysis required, any of the following conditions must exist: the top oil temperature must be greater than 100° C., or the hot spot tempera- 1000 parts per million, or the change of the amount of gas in oil must be greater than 75 parts per million per twenty-four hours, or the relative corona must be greater than 25% and the gas in oil must be greater than 800 parts per million, or the relative corona must be greater than 25% and the change in the amount of gas must be greater than 50 parts per million per twenty-four hours.

For the resulting action on Table 1 to be contact utility—recommend take transformer off-line, any of the following conditions must exist: the top oil temperature must be greater than 110° C., or the hot spot temperature must be greater than 170° C., or the relative corona must be greater than 50%, or the gas in oil must be greater than 1500 parts per million, or the change of the amount of gas in oil must be greater than 100 parts per million per twenty-four hours, or the relative corona must be greater than 30 parts per million and the gas in oil must be greater than 750 parts per million, or the relative corona must be greater than 30% and the change of the amount of gas in oil must be greater than 750 parts per million per twenty-four hours.

Table 1 can be implemented in software for the microcomputer 130 by anyone skilled in the art, using well-known programming techniques. Such a program would include a plurality of decision steps for determining which, if any, of the reference values shown in Table 1 has been exceeded and for producing the appropriate response. Table 1 can also be implemented with hardware techniques.

In addition to carrying out the analysis depicted in the FIG. 5 flow chart, the host computer 158 (see FIG. 3) adds the collected data to an historic data base for the monitored transformer. The host computer 158 can then perform a trend analysis on the data. If the transformer monitoring system 10 is used on a power transformer, this trend analysis can detect early problems, because most power transformer problems occur over long periods. Lastly, the host computer 158 can provide a table of the collected data to the utility. The table could indicate minimum, maximum, and instantaneous values for each monitored parameter and the time of occurrence of each. Also, additional monitors can be added to the transformer monitoring system 10 to provide data relative to other aspects of the condition of the monitored transformer. The software operating the microcomputer 130 or the host computer 158 (see FIG. 3) can also be altered to provide alarms or responses based on other transformer parameters, such as pressure, loss-of-life calculations, allowable load-time profiles, or the rate of rise of any of the monitored parameters.

What is claimed is:

1. A method of on-line monitoring of transformer performance, wherein the transformer includes a cooling system, said method comprising the steps of:
   monitoring at least one parameter related to transformer load;
   collecting periodic load data in response to the monitored parameters related to transformer load;
   monitoring transformer parameters related to transformer condition;
   collecting periodic condition data in response to the monitored parameters related to transformer condition;
   establishing predetermined load threshold values;
   establishing predetermined condition threshold values;
   comparing said periodic load data with said predetermined load threshold values;
   comparing said periodic condition data with said predetermined condition threshold values; and
   evaluating transformer performance in response to the comparison steps.

2. The method of claim 1 wherein the step of monitoring at least one transformer parameter related to transformer load includes monitoring the current in the hottest winding of the transformer.

3. The method of claim 1 wherein the step of monitoring transformer parameters related to transformer condition includes monitoring the transformer hot spot temperature.

4. The method of claim 1 wherein the step of monitoring transformer parameters related to transformer condition includes monitoring the cooling system oil temperature.

5. The method of claim 1 wherein the step of monitoring transformer parameters related to transformer condition includes monitoring the transformer cabinet and ambient temperatures.

6. The method of claim 1 wherein the step of monitoring transformer parameters related to transformer condition includes monitoring partial discharges in the transformer.

7. The method of claim 1 wherein the step of monitoring transformer parameters related to transformer condition includes monitoring the dielectric quality of and amount of gas dissolved in the oil of the transformer insulation system.

8. The method of claim 1 wherein the step of monitoring transformer parameters related to transformer condition includes monitoring the pressure within the transformer.

9. The method of claim 1 wherein the step of monitoring transformer parameters related to transformer condition includes monitoring the cooling system fluid level.

10. The method of claim 1 wherein the step of monitoring transformer parameters related to transformer condition includes monitoring the cooling system fluid flow.

11. The method of claim 1 wherein the step of monitoring transformer parameters related to transformer condition includes monitoring the condition of the cooling system pump bearings.

12. The method of claim 1 wherein the step of monitoring transformer parameters related to transformer condition includes determining the position of a switch for activating the cooling system.

13. The method of claim 1 including the steps of:
   storing a maximum and a minimum value for each parameter related to transformer load;
   storing the time of occurrence for said maximum and said minimum value for each parameter related to transformer load;
   storing a maximum and a minimum value for each parameter related to transformer condition;
   storing the time of occurrence for said maximum and said minimum value for each parameter related to transformer condition;
   storing an instantaneous value for each parameter related to transformer load; and
   storing an instantaneous value for each parameter related to transformer condition.

14. The method of claim 1 including the steps of:
   activating an alarm when a predetermined number of successive periodic load data values exceed the predetermined load threshold value; and
   activating an alarm when a predetermined number of successive periodic condition data values exceed the predetermined condition threshold value.

15. The method of claim 1 including the step of controlling the cooling system in response to the comparison steps.

16. A method of on-line monitoring of transformer performance comprising the steps of:
   monitoring at least one parameter related to transformer load;
   collecting periodic load data in response to the monitoring of at least one parameter related to transformer load;
   monitoring a plurality of parameters related to transformer condition;
   collecting periodic condition data in response to the monitoring of said plurality of parameters related to transformer condition;
   establishing a threshold hierarchy having a plurality of levels, wherein each level includes predetermined load threshold values and predetermined condition threshold values;
   comparing said periodic load data with said predetermined load threshold value in each one of said plurality of levels;

comparing said periodic condition data with said predetermined condition threshold value in each one of said plurality of levels; and providing a predetermined response in response to the comparison steps, wherein said predetermined response is based on the level of said predetermined load or said predetermined condition threshold values exceeded.

17. The method of claim 16 wherein the step of establishing a threshold hierarchy having a plurality of levels includes establishing a threshold hierarchy having first, second, third, and fourth levels.

18. The method of claim 17 wherein the step of providing a predetermined response includes:
continuing normal collecting of periodic load data and periodic condition data when none of the load threshold values or the condition threshold values of the first level are exceeded;
accelerating the rate of collecting periodic load data and periodic condition data when at least one of the load threshold values or one of the condition threshold values of the first level is exceeded, but none of the load threshold values or the condition threshold values of the second level are exceeded;
providing more extensive analysis of the transformer when at least one of the load threshold values or one of the condition threshold values of the second level is exceeded, but none of the load threshold values or the condition threshold values of the third level are exceeded;
reducing transformer load when at least one of the load threshold values or one of the condition threshold values of the third level is exceeded, but none of the load threshold values or the condition threshold values of the fourth level are exceeded; and
taking the transformer out of service when at least one of the load threshold values or one of the condition threshold values of the fourth level is exceeded.

19. A method of on-line monitoring of transformer performance comprising the steps of:
monitoring at least one parameter related to transformer load;
collecting periodic load data in response to said monitoring of at least one parameter related to transformer load;
monitoring a plurality of parameters related to transformer condition;
collecting periodic condition data in response to said monitoring of said plurality of parameters related to transformer condition;
establishing an alarm threshold value for each parameter related to transformer load;
establishing an alarm threshold value for each parameter related to transformer condition;
comparing, on site, said periodic load data with said established transformer load alarm threshold value;
comparing, on site, said periodic condition data with said established transformer condition alarm threshold value;
activating an on-site alarm when said periodic load data exceeds said established transformer load alarm threshold value or when said periodic condition data exceeds said established transformer condition alarm threshold value;
sending said periodic load data and said periodic condition data to a central computer;
establishing, in said central computer, a threshold hierarchy having a plurality of levels, wherein each level includes predetermined load threshold values and predetermined condition threshold values;
comparing said periodic load data with said predetermined load threshold value in each one of said plurality of levels;
comparing said periodic condition data with said predetermined condition threshold value in each one of said plurality of levels; and
providing a predetermined response from said central computer, in response to the comparison steps, wherein said predetermined response is based on the level of said predetermined load or said predetermined condition threshold value exceeded.

20. A transformer monitoring system for on-line monitoring of transformer performance, wherein the transformer includes a cooling system, said transformer monitoring system comprising:
sensor means for periodically collecting load data representative of at least one load related parameter;
sensor means for periodically collecting condition data respresentative of a plurality of condition related parameters;
means for establishing a hierarchy of predetermined load thresholds, wherein said hierarchy includes a plurality of levels such that each level includes a load threshold value for each load related parameter;
means for establishing a hierarchy of predetermined condition thresholds, wherein said hierarchy includes a plurality of levels such that each level includes a condition threshold value for each condition-related parameter;
first comparator means for comparing said load data with said predetermined load threshold value in each level, and for indicating when a load threshold value is exceeded;
second comparator means for comparing said condition data with said predetermined condition threshold value in each level, and for indicating when a condition threshold value is exceeded; and
means responsive to said first and said second comparator means for providing a predetermined response dependent on the level of the exceeded load threshold value or condition threshold value.

* * * * *